US008132427B2

(12) United States Patent  
Brown et al.

(10) Patent No.: US 8,132,427 B2  
(45) Date of Patent: Mar. 13, 2012

(54) PREVENTING GAS FROM OCCUPYING A SPRAY NOZZLE USED IN A PROCESS OF SCORING A HOT GLASS SHEET

(75) Inventors: James William Brown, Painted Post, NY (US); Patrick Michael Gargano, Corning, NY (US); Keith Mitchell Hill, Horseheads, NY (US); Xinghua Li, Horseheads, NY (US); William Paul Ryszytiwskyj, Corning, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 386 days.

(21) Appl. No.: 12/466,554

(22) Filed: May 15, 2009

(65) Prior Publication Data

US 2010/0287991 A1    Nov. 18, 2010

(51) Int. Cl.  
C03B 33/00 (2006.01)  
C03B 33/02 (2006.01)  
C03B 33/023 (2006.01)  
C03B 33/037 (2006.01)

(52) U.S. Cl. .................. 65/97; 65/112; 65/174

(58) Field of Classification Search ............. 65/97, 112, 65/114, 174, 348; 239/106, 124  
See application file for complete search history.

(56) References Cited

U.S. PATENT DOCUMENTS

| 3,453,097 A * | 7/1969 | Hafner ..................... 65/112 |
| 3,830,540 A * | 8/1974 | Sperry ..................... 294/118 |
| 4,419,677 A | 12/1983 | Kasugayama et al. ........ 346/140 |
| 4,467,168 A * | 8/1984 | Morgan et al. ........... 219/121.67 |
| 4,658,274 A | 4/1987 | DeYoung .................... 346/140 |
| 4,702,042 A * | 10/1987 | Herrington et al. ............. 451/40 |
| 4,937,598 A | 6/1990 | Hine et al. .................... 346/140 |
| 2006/0151450 A1* | 7/2006 | You et al. ................ 219/121.67 |

FOREIGN PATENT DOCUMENTS

WO    WO2006/074280    7/2006

* cited by examiner

*Primary Examiner* — Matthew Daniels  
*Assistant Examiner* — Cynthia Szewczyk  
(74) *Attorney, Agent, or Firm* — Kevin M. Able

(57) ABSTRACT

A spray nozzle is used in a process of quenching a hot glass sheet during a laser scoring process or other high energy glass heating process. The scoring is conducted by a high energy means such as a laser. The nozzle is located in proximity to the glass sheet, creating gas in liquid used to quench the glass located in the nozzle (e.g., water). The gas (e.g., air bubbles) is removed from the quenching liquid. Then, the spray nozzle is used to spray the quenching liquid onto the sheet at a location trailing laser scoring of the sheet, such as using a traveling anvil machine at the bottom of the draw. The spray nozzle (purge nozzle) has a purge opening and tubing leading to a discharge location. The purge nozzle can have a sloped passageway that pre-stages gas bubbles near the purge opening in the nozzle. The spray nozzle can include a cooling coil passing around the nozzle passageway that enables a coolant to travel along the coil. This cools the quenching liquid passing through the nozzle, and increases the solubility of bubbles in the quenching liquid in the nozzle. A gas filter can receive gas-rich quenching liquid from the pressurized quenching liquid source, remove gas from the liquid, and send gas-depleted quenching liquid to the spray nozzle.

8 Claims, 7 Drawing Sheets

PREVENTING GAS FROM OCCUPYING A SPRAY NOZZLE USED IN A PROCESS OF SCORING A HOT GLASS SHEET

BACKGROUND OF THE INVENTION

1. Technical Field

The field is quenching a sheet of hot glass during the scoring process with a jet of water.

2. Technical Background

A fusion process (e.g., downdraw process) forms high quality thin glass sheets that can be used in a variety of devices such as flat panel displays. Glass sheets produced in a fusion process have surfaces with superior flatness and smoothness when compared to glass sheets produced by other methods. The fusion process is described below with respect to FIG. 1 (Prior Art) but for a more detailed description refer to co-assigned U.S. Pat. Nos. 3,338,696 and 3,682,609, which are incorporated herein by reference in their entireties.

FIG. 1 shows a schematic view of an exemplary glass manufacturing system 10 which utilizes the fusion process to make a glass sheet 12. As shown, the exemplary glass manufacturing system includes a melting vessel 14, a fining vessel 16, a mixing vessel 18, a delivery vessel 20, a fusion draw machine (FDM) 22, and a traveling anvil machine (TAM) 24. Typically the components 16, 18 and 20 are made from platinum or platinum-containing metals, but they may also comprise other refractory metals.

The melting vessel 14 is where the glass batch materials are introduced as shown by arrow 26 and melted to form molten glass 28. The melting vessel 14 is connected to the fining vessel 16 by a melting to fining vessel connecting tube 30. The fining vessel 16 has a high temperature processing area that receives the molten glass 28 (not shown at this point) from the melting vessel 14 and in which bubbles are removed from the molten glass 28. The fining vessel 16 is connected to the mixing vessel 18 by a finer to stir chamber connecting tube 32. And, the mixing vessel 18 is connected to the delivery vessel 20 by a stir chamber to bowl connecting tube 34. The delivery vessel 20 delivers the molten glass 28 through a downcomer 36 into the FDM 22 which includes an inlet 38, a forming vessel 40 (e.g., isopipe), and a pull roll assembly 42.

As shown, the molten glass 28 flows from the downcomer 36 into the inlet 38 which leads to the forming vessel 40 which is typically made from a ceramic or a glass-ceramic refractory material. The forming vessel 40 includes an opening 44 that receives the molten glass 28 which flows into a trough 46 and then overflows and runs down two lengthwise sides 48 (only one side shown) before fusing together at what is known as a root 50. The root 50 is where two lengthwise sides 48 come together and where the two overflow walls of molten glass 28 rejoin (e.g., refuse) to form the glass sheet 12 which is then drawn downward by the pull roll assembly 42. The glass sheet cools as it is drawn, transitioning from a molten state at the root, to a visco-elastic state and finally to an elastic state. The pull roll assembly 42 delivers the drawn glass sheet 12 which, at the bottom of the isopipe is substantially flat, but which later in the process may develop a slightly bowed or curved shape across the width and/or length of the glass sheet 12. This bowed shape may remain in the glass sheet 12 all the way to the TAM 24. The TAM 24 has a laser-mechanical scoring device 52 and a nosing device 54 which are used to score the drawn glass sheet so it can then be separated into distinct pieces of glass sheets 56. The TAM 24 is located in the elastic region of the sheet in an area referred to herein as a bottom of the draw 58.

More specifically, FIG. 2 (Prior Art) is a schematic view showing a laser scoring process at the TAM for use on a hot glass sheet 12. The glass sheet has a major surface 60, a first side 62 and a second side 64. Laser scoring and quenching occur from the first side to the second side, or vice versa, across the width of the glass. A laser beam is formed by using a laser 68, such as a stationary $CO_2$ laser mounted to the floor 70, to form a laser beam 72. The laser beam is expanded (not shown) and redirected, for example, using two mirrors 74 into an optical head 76. There the laser beam may then be transformed by one or more lenses 78, such as a pair of cylindrical lenses, to form a laser beam having an elliptical footprint. The laser beam is then redirected using a mirror 82 onto the major surface 60 of the glass. The laser beam having the elliptical footprint is used to heat the glass sheet in a localized area along the desired line of separation or score line 84. The optical head moves across the width of the glass sheet along a linear slide 86 while the TAM 24 travels vertically (along path 88) the same speed as the glass sheet (which is moving along path 90) such that there is no relative motion between the TAM and the glass.

FIG. 2 shows the optical head 76 and a quenching nozzle assembly 92 in front of it, which are movable along the linear slide of the TAM for movement across the width of the glass. This figure shows the devices in an initial position at the first side 62 for laser scoring and quenching and then toward the second side 64, shows the affected areas of the glass resulting from laser scoring and quenching. The glass sheet is first nicked or scored at 96 along one edge of the glass sheet by a mechanical scribe (not shown). This crack initiation point is then used to form a crack 98, by movement of the laser beam across the glass sheet and then quenching with a cooling stream in the path of the desired line of separation. The figure shows the laser beam position after it passes the mechanical nick made in the glass. The laser beam spot 66 travels across the width of the glass sheet to trace the path of the scoreline 84. The beam is moved relative to the glass at a speed on the order of 200 to 1000 millimeters per second. As the laser beam heats the surface of the glass, the nozzle assembly 92 following a close distance behind a tail of the laser spot 66 sprays the glass with a jet of highly cohesive water 100. When performed with the correct thermal balance (taking into account beam profile, beam energy, process speed, water volume and the distance between the water nozzle behind the beam) this rapid cooling of the glass surface generates a tensile stress sufficient to generate a median crack 98 from the preexisting starter defect (crack initiation point) and propagates it across the glass surface toward the second side 64 at process speeds. The crack extends only partway into the thickness of the glass. A conventional robotic apparatus below the TAM (not shown) holds the sheet with suction cups, bends the sheet and breaks it along the score line. The TAM 24 operates in cycles, the cycle beginning at the first side 62 of the glass at a location that is above the location where the glass will be bent and separated. The optical head 76 and quenching nozzle assembly 92 move along the score line from the first end 62 toward the second side 64 of the glass, while the glass and the TAM continue to travel vertically downward at the same rate. The TAM then reaches the end of its stroke at the second side 64 once the laser scoring and quenching processes are completed. The glass bending is carried out along the score line and the robotic equipment located near but below the score line at this point of downward travel of the sheet, separates an individual glass sheet from the ribbon. The TAM moves upward, returning to the beginning of the stroke at the first side 62 of the glass.

SUMMARY

When quenching a hot glass sheet during laser scoring, the release of water from the water nozzle must be precisely controlled. If the water jet sputters, even for a microsecond, during the quenching process the quenching of the glass sheet will be discontinuous. This sporadic condition is unacceptable since when the water flow is stopped, quenching is stopped, and the crack that is propagated across the glass sheet is therefore also stopped. This causes the laser scoring process to fail. During scoring, it is imperative that neither the laser beam nor the corresponding quench nozzle flow is interrupted so that the local stress riser they create, as they traverse the glass in concert, is not disrupted. The crack is propagated along this stress riser across the sheet width, cleaving it from its parent sheet assisted by a bending operation. If an interruption in quench spraying occurs, local sheet cracks or entire ribbon cracking in the glass could occur due to unsuccessful separation. The water flow must "guillotine" on and off when desired. If water dribbles out from the nozzle after the water flow from the nozzle is turned off, it might contact a quality region of the glass, resulting in potential weakening of the glass there and likely scrapping of that section of glass sheet. Continuous beads (thickened areas of glass) are formed along the outer periphery of the first and second sides 62, 64 of the glass where the pull rollers contact the glass. A quality region of the glass is the major surfaces of the glass between the beads.

A sporadic flow of quenching water can occur as a result of the high heat of the draw radiating on the water nozzle and the surrounding water conveyance tubing. It was discovered that due to this heating, the air solubility of the water in the nozzle and accompanying water supply tubing was changing, causing the dissolved air in the supply water to outgas and form air spaces or air bubbles in the tubing, nozzle body and nozzle tip. This disclosure will often refer to this as air bubbles or microbubbles for simplicity even if air spaces or air pockets occurred. These air bubbles accumulated, which in turn raised two issues. First, if large enough, these air bubbles covered the nozzle orifice and caused an interruption in water flow out of the nozzle. Second, the presence of air bubbles caused an undesirable delay in the time required to turn on or turn off the nozzle at the end of the scoring stroke. This in turn undesirably caused the water stream to continue flowing and to strike the next glass sheet in the quality area as the system traversed back to its home position.

Both of these behaviors are fundamentally caused by small bubbles or microbubbles on the order of several tens to hundreds of microns in size being present in the water system, which are generated at elevated temperatures due to air solubility change in the water. Bubbles occur when air comes out of solution due to the high temperature of the water caused by the proximity of the water nozzle to the hot glass sheet. The sheet may be at a temperature of, for example, about 400° C. The outgassed air forms bubbles that coalesce in a region near the nozzle. This coalescing occurs while the water is passing through the nozzle assembly. Due to the nozzle geometry, these air bubbles may remain for hours within the nozzle body/nozzle tip before they grow large enough to partially purge out the orifice tip. Since air seeks its highest point it travels to the location in the nozzle above the tip. Air will not ordinarily come out of the nozzle tip. Once some bubbles are formed they can accumulate to form larger bubbles or air spaces. These larger bubbles become compressed when the nozzle operates at a high pressure. Then, when the water flow through the spray nozzle is turned off, the now compressed larger bubbles expand as the system returns to atmospheric pressure, which undesirably displaces water from the nozzle.

In general, a system for preventing gas from occupying a spray nozzle used in quenching a sheet of hot glass during a scoring process includes a source of pressurized quenching liquid. A main liquid supply line leads from the pressurized quenching liquid source. A spray nozzle includes a body having a nozzle passageway in communication with the main liquid supply line. A tip is connected to the nozzle body in communication with the nozzle passageway. The tip has an orifice adapted to release a jet of the quenching liquid for quenching the sheet when the spray nozzle is positioned in proximity to the sheet. Means for removing gas from the quenching liquid prevents the gas from occupying the spray nozzle. As discussed below, this means for removing gas can include one, more or all of a purging nozzle, a purging nozzle that pre-stages bubbles, a cooling coil and a gas filter.

In a first embodiment the means for removing gas features a system for quenching a sheet of hot glass, for example, during laser scoring using a spray nozzle having a purging function (i.e., a purge nozzle). The purge nozzle has a purge opening located at an upper portion of the nozzle in communication with the nozzle passageway. A purge line leads from the purge opening to a discharge location remote from the purge nozzle. A tip is connected to the purge nozzle having an orifice for releasing a jet of quenching liquid for quenching the scored hot glass sheet. The purge opening is much larger than the tip orifice. A primary (e.g., solenoid) valve is disposed in the main liquid supply line. A secondary (e.g., solenoid) valve is disposed between the remote discharge location and the spray nozzle. A programmable logic controller sends electrical signals to the primary and secondary solenoids for opening and closing the primary and secondary valves during quenching and purging.

An air accumulator or stand tube is disposed upstream of the primary solenoid at an elevated position. The air accumulator has an air purge opening. A purge valve can be located in the air purge opening of the air accumulator for manual or PLC-controlled purging of large air bubbles that accumulate here especially upon initial set-up of the system.

The purging system described in this disclosure actively removes dissolved gasses (e.g., air) from a liquid media (e.g., deionized water). Although the purging system is applicable to other quenching liquids besides water, and to other outgases besides air, for the sake of clarity this disclosure will refer to the quenching liquid as water and to outgases as air.

The purge nozzle removes air bubbles from the water stream such that the water flow is not interrupted out of the tip of the nozzle assembly while it traverses the hot glass during quenching. This is accomplished by placing the purge opening in the top portion of the nozzle body in the area where the micro air bubbles coalesce and stagnate in the nozzle body and nozzle tip region. The purge opening is controlled with the purge line solenoid valve. When the purge line solenoid valve is open, air bubbles are redirected from the purge nozzle out of the purge line. The redirected flow evacuates the stagnated area from the nozzle body, sweeping out the troublesome air bubbles from this region and discarding them.

Purging can be carried out when the primary solenoid is on (main water line is open) or when it is off. If the primary solenoid is on while purging occurs, this is usually to remove gross bubble formation from the purge nozzle. While the purging occurs water flows out of the tip orifice. For the purge to work correctly, the main orifice of the nozzle tip must be sized such that liquid flow still exits the tip orifice during purging. If flow is not maintained through the tip orifice during the purge cycle, ambient air will be pulled back through the tip orifice and into the nozzle body, effectively negating the air purge that happens on that cycle. If the primary solenoid is off (main water line is closed), as in normal purging, then the amount of the water and air mixture removed through the purge opening must be less than an amount that would cause air to enter the purge nozzle through the tip orifice. Normally, this is not a concern as the purge valve is open for only on the order of about 50 milliseconds.

Once the purging nozzle is installed and the purging is operational, the nozzle tip operates normally (i.e., like at room temperature) even though the 400° C. glass ribbon is just inches away from the nozzle body. Due to the radiant heating of the nozzle body and nozzle tip from the glass ribbon, the uncooled nozzle assembly temperature is maintained at about 65° C. At this elevated temperature the air solubility is significantly reduced compared to room temperature, which reduces the water's ability to hold in solution the naturally dissolved air it contained at 25° C.

The purging cycle can be executed each cycle (e.g., 1 time every 23 seconds), or it can be executed at any timing required. The purge timing is fundamentally based on air bubble growth rate (dissolved air versus operating temperature). If the air bubble growth rate increases, the corresponding timing for the frequency and/or duration of the purge cycle can also be increased. We can monitor water pressure in the purge nozzle as an indication of air bubble size to adjust this purging duration and frequency.

In a second embodiment the means for removing gas features a purging nozzle body in which the nozzle passageway includes a sloped surface that extends at an upward angle in a direction from the tip toward the purge opening. The sloped surface is at a suitable angle for causing the microbubbles to pre-stage near the purge opening, for example, about 8° from horizontal. Microbubbles move along the sloped surface of the nozzle passageway toward the purge opening during the quenching operation. It will be appreciated that various shapes of sloped surfaces and angles of slopes thereof can be used so long as they assist in pre-staging the bubbles for removal near the purge opening. While not wanting to be bound by theory, the microbubbles are normally resistant to movement due to the surface tension of the bubbles for the interior nozzle body and the pressure of the water passing through the purge nozzle during the normal quenching operation. However, once the purge valve is opened, the bubbles are removed from the interior of the nozzle body, out the purge opening into the purge line and to the discharge location where they are vented to the atmosphere. Normally, the bubbles accumulate into larger sized elongated bubbles that at upper surfaces take the shape of the interior sloped surface as they approach the purge opening. Near the purge opening the air may exist as one or both of an air space or bubbles. Ideally, all of the bubbles are removed from the purge nozzle during each purging. However, some bubbles may remain in the purge nozzle after purging and can be tolerated so long as they do not cause stream interruption. Normally, air bubbles remain in the purge line between the purge opening and the purge solenoid valve between purgings.

In a third embodiment the means for removing gas features a cooling coil or helix extending in the spray nozzle around the nozzle passageway. Although the cooling coil is shown and discussed in a purge nozzle for the sake of clarity, it could also be used in a spray nozzle having no purge opening. The cooling coil has a fluid inlet and a fluid outlet. Coolant is passed into the fluid inlet, travels through the coil, through the nozzle body around the nozzle passageway and then is removed from the fluid outlet, which cools the quenching liquid passing through the nozzle passageway. This increases the solubility of the gas in the quenching liquid in the spray nozzle, avoiding bubble formation there. The cooling coil feature can be used alone or in combination with one or more of the purge nozzle, purge nozzle with pre-staging of bubbles, and the gas filter discussed below. The coolant can be recirculated or continuously replenished into the coil in a known manner. The coolant can be cold tap water, compressed air, a gel, or some other coolant that enables heat transfer from the quenching fluid of the spray nozzle. In fact, all components of the purge nozzle system including the solenoid valves can be cooled by such a circulating coil coolant system. The purging occurs at the end of a scoring run when the purge nozzle is located at the second side 64 of the glass sheet. Thereafter, the liquid may remain in the purge nozzle for a sufficient time such that the cooling coil can reduce the liquid temperature to a point at which the solubility of the gas in the liquid is increased. By cooling the quenching liquid in the spray nozzle, more of the gas microbubbles stay in solution.

In a fourth embodiment the means for removing gas features an air filter including an elongated body having opposing ends. Hollow porous hydrophobic fibers extend along a length of the body between the ends and have openings at the ends. The fibers are sealed at the ends exposing the fiber openings. A fluid inlet is located at one of the ends and a fluid outlet is located at another of the ends. The fluid inlet and outlet are in fluid communication with the openings of the fibers. The fluid inlet receives gas-rich quenching liquid along the main supply line from the pressurized quenching liquid source and the fluid outlet discharges gas-depleted quenching liquid along the main supply line to the spray nozzle. The terms gas-rich and gas-depleted are relative terms and are not intended to precisely describe the amount of gas in the quenching liquid. Vacuum ports along the length of the body are in communication with an exterior of the fibers. A vacuum source is connected to the vacuum ports.

A fifth embodiment features a method for preventing gas from occupying a spray nozzle used in quenching a sheet of hot glass during a scoring process. Provided is a source of pressurized quenching liquid, a main liquid supply line leading from the pressurized quenching liquid source, a spray nozzle including a body having a nozzle passageway in communication with the main liquid supply line, and a tip connected to the nozzle body in communication with the nozzle passageway. The tip has an orifice adapted to release a jet of the quenching liquid. A gas removal device is used to remove gas from the quenching liquid, which prevents the gas from occupying the spray nozzle. A jet of the quenching liquid is sprayed through the orifice onto the sheet during a scoring process without interruption in the jet. Once the scoring process is complete, the jet of the quenching liquid is shut off without a substantial time delay.

A method for quenching a scored sheet of hot glass using gas purging includes spraying a jet of the quenching liquid on the scored hot glass sheet by closing the secondary valve and by opening the primary valve wherein the pressurized liquid is fed along the main liquid supply line, along the nozzle passageway and through the tip orifice. When the quenching operation ends the purge nozzle is moved away from the glass sheet. Gas in the purge nozzle is purged by opening the secondary valve and directing the liquid through the purge opening and along the purge line to the discharge location.

The operation of the purging valve permits subsequent instantaneous shut off of the purge nozzle. The system purges the bubbles from the system whenever purging is needed. This can occur after several scoring cycles or every scoring cycle if desired depending on the extent of the air formation in the purge nozzle. When the secondary solenoid is activated, a mixture of water and bubbles is purged from the purge nozzle. The secondary solenoid valve is closed, and then the water jet can be instantaneously turned on and off even while continuing to operate in the hot environment that is conducive to bubble formation. The TAM begins its cycle at the top of the stroke where it moves downward along with the glass such that there is no relative motion between the TAM and the glass. The initial brief mechanical scribing occurs, then the laser scoring operation is conducted at which time the primary solenoid valve is activated, releasing the jet of highly cohesive quenching water onto the glass on a narrowly defined region of the glass trailing the laser beam. During this time the glass sheet continues to travel downward. When the scoring is complete, the TAM finishes its downward travel. At its downward end stroke the primary solenoid is turned off. Immediately thereafter, the purge nozzle is opened and purging is conducted. The TAM dwells briefly (e.g., for about a second) at the end of its downward end stroke and then begins to travel back up to the starting position. Meanwhile, the glass is broken by robotic bending of the glass sheet while holding the glass with suction cups. The purge nozzle then arrives at its home position.

Primary advantages of the gas removing features disclosed herein, the purge nozzle, purge nozzle with pre-staging of bubbles, cooling coil and gas filter, include the ability to use the spray nozzle in a solid or misting stream condition at elevated temperature without an interruption in water flow from the nozzle. Also, the spray nozzle can deliver a fluid in close proximity to a high temperature source without an interruption in flow. The spray nozzle can operate like at room temperature while spraying high temperature fluid. The features disclosed herein can be applied to removing various gases from various liquids at a range of temperatures. These features also prevent air bubbles from covering the nozzle orifice opening and causing an interruption or perturbation of water flow out of the spray nozzle. Furthermore, these features remove air bubbles from the nozzle tip such that shut off performance of the spray nozzle is enhanced.

DETAILED DESCRIPTION

Figure 1:
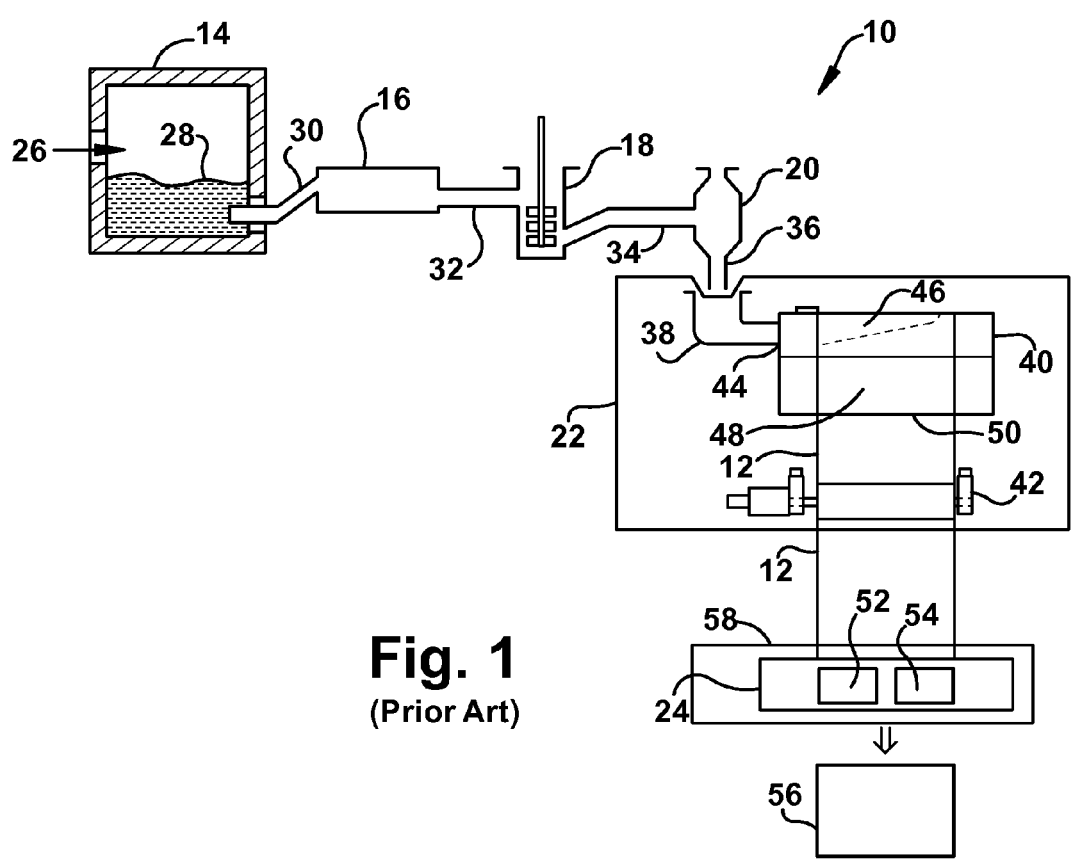
FIG. 1 (Prior Art) is a schematic view of a prior art glass manufacturing system which utilizes the fusion process to make a glass sheet.
Figure 2:
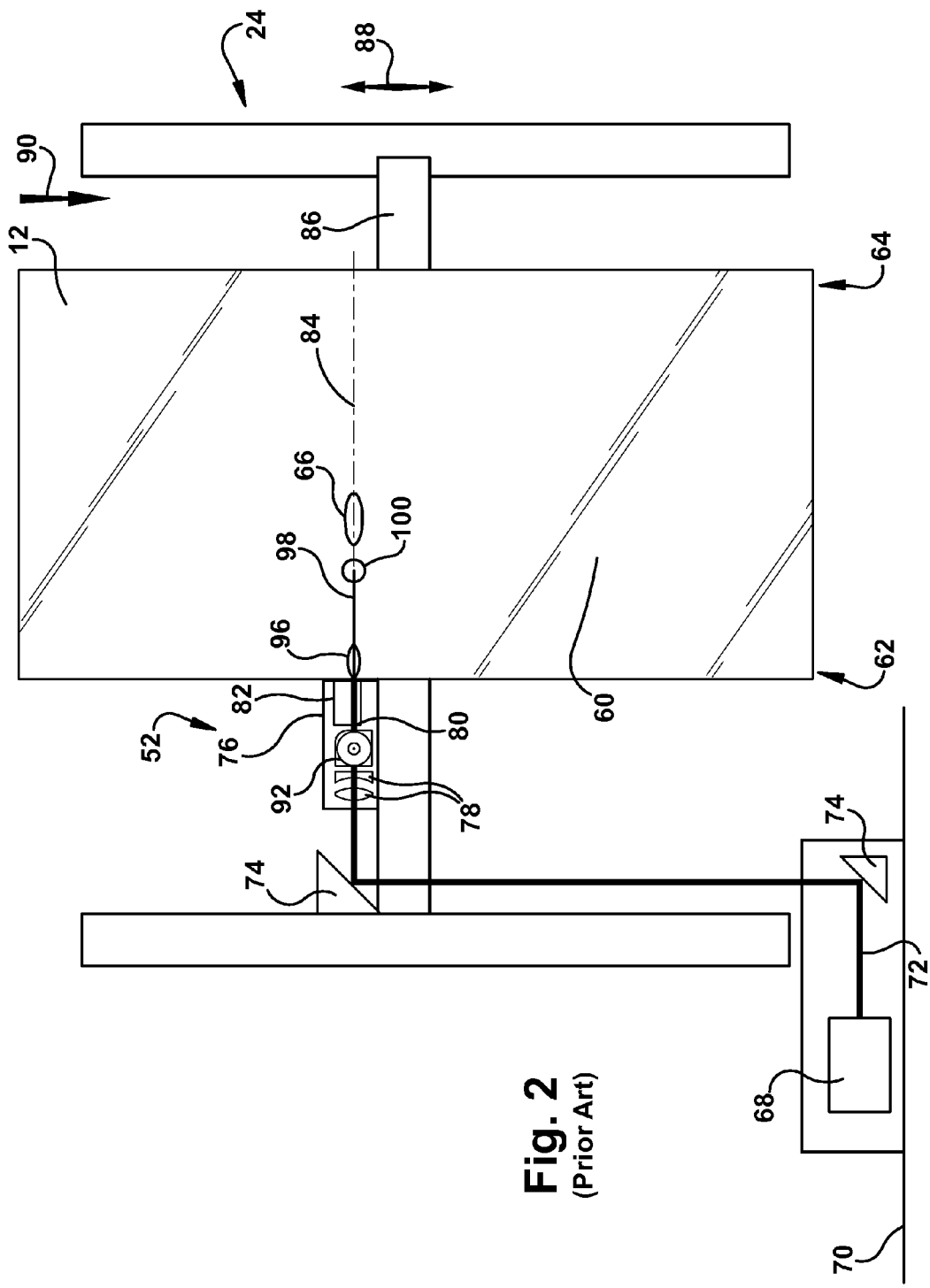
FIG. 2 (Prior Art) is a schematic view of a prior art system for quenching and laser scoring a hot glass sheet.
Figure 3:
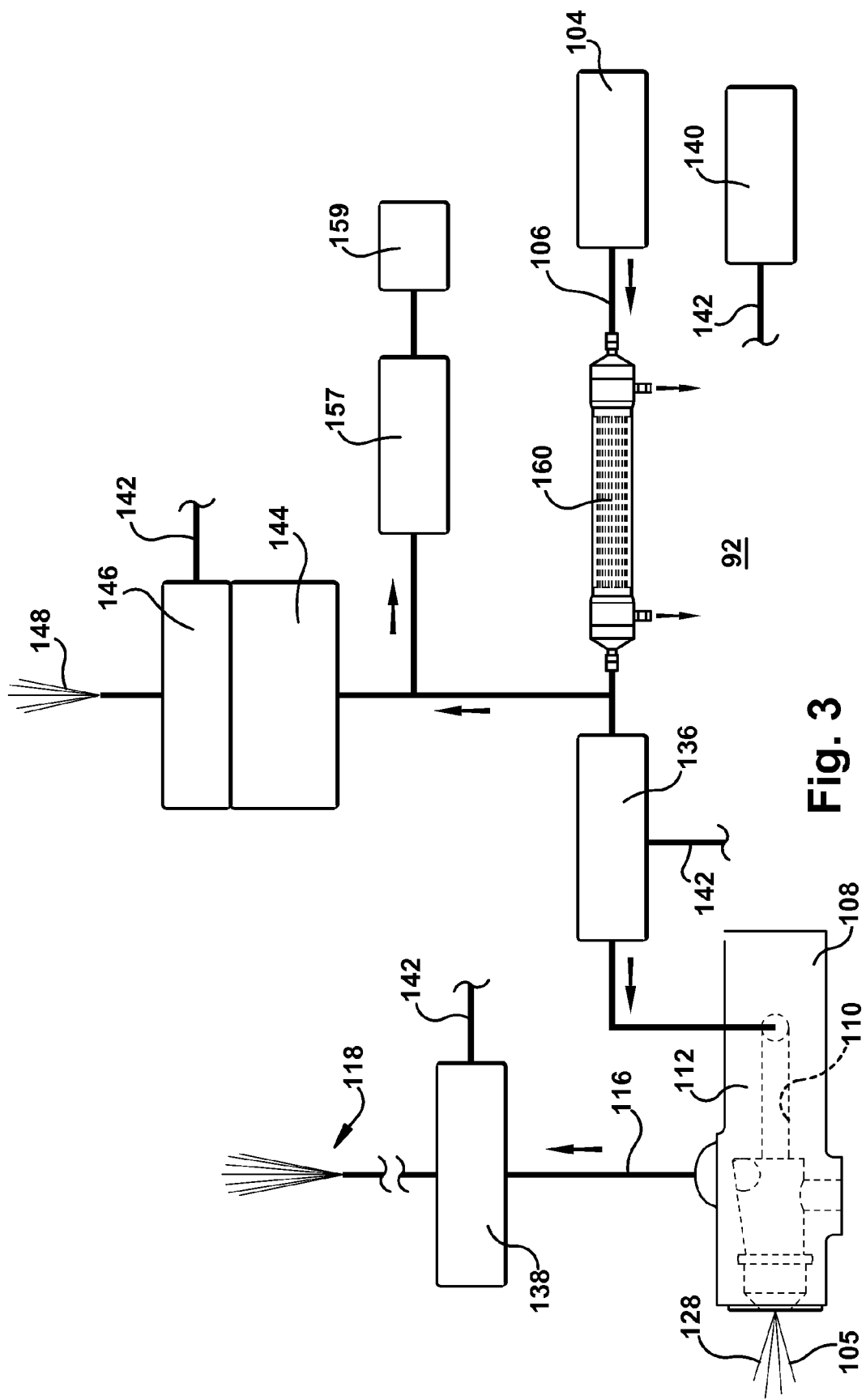
FIG. 3 shows general components of a purge nozzle system of this disclosure.
Figure 4:
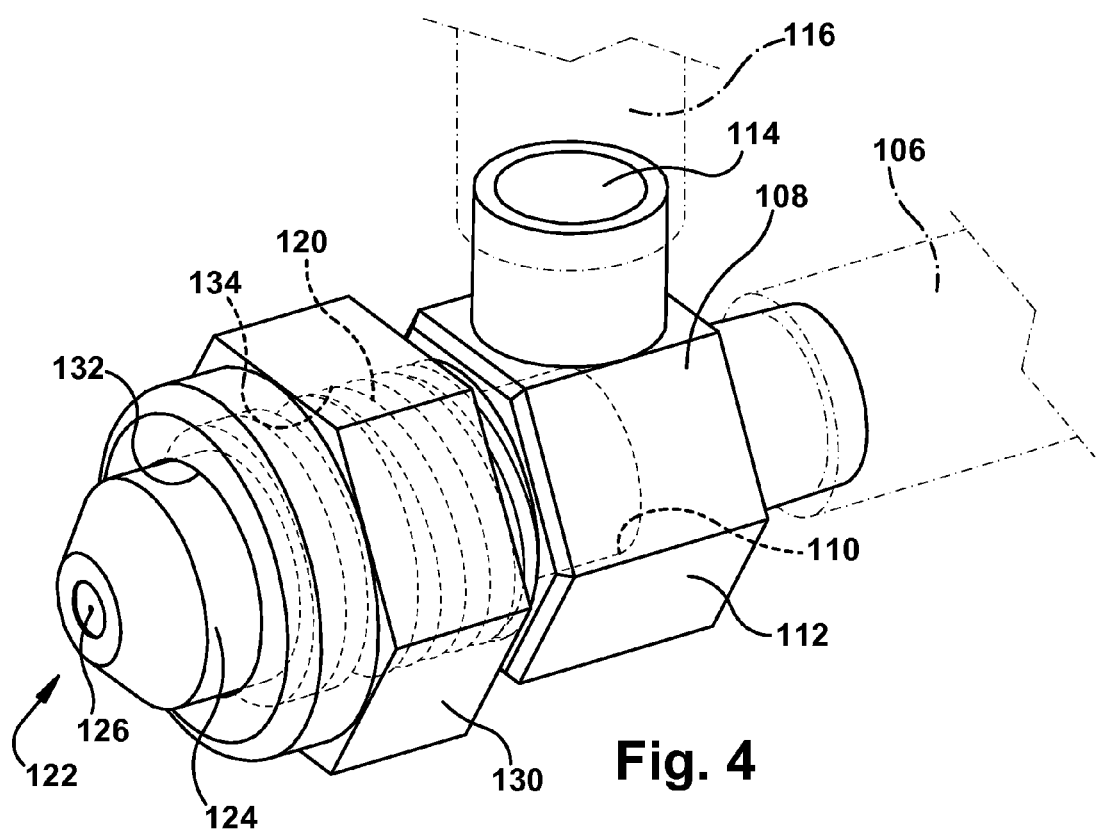
FIG. 4 is a perspective view of a first embodiment of a purge nozzle that can be used in the system shown in FIG. 3.

This detailed description discusses the air removal features of: the purge nozzle, the purge nozzle with pre-staged bubbles, the purge nozzle with cooling coil and the air filter, all used in combination. However, it will be appreciated that one or other combinations of the air removal features can be used. Shown in FIG. 3 is an improved quenching nozzle assembly 92 for quenching a laser scored sheet of hot glass 12. One component of the system is a source 104 of pressurized water 105. The source of pressurized water is an air charged pressure pot from which water flow is controlled by a rotometer. A main water supply line 106 leads from the pressurized water source. A purge nozzle 108 has a nozzle passageway 110 in communication with the main water supply line. The purge nozzle has a nozzle body 112. A purge opening 114 is formed in the nozzle body in communication with the nozzle passageway (FIG. 4). A purge line 116, connected to the nozzle body by a fitting, leads from the purge opening to a discharge location 118 remote from the purge nozzle. The nozzle body is exteriorly threaded at 120 at its front end 122 (FIG. 4). A tip 124 has an orifice 126 that releases a jet of water 128 at a flow rate adapted for quenching the laser scored glass sheet. A fastener 130 has a central opening 132 that receives the tip therein. The fastener has threads 134 by which it is threaded to the nozzle body, which securely connects the tip to the nozzle body. The orifice 126 has a size, for example, on the order of 200 to 350 microns in diameter while the purge opening 114 has a size on the order of 0.16 cm in diameter. The purge nozzles of all embodiments described in this disclosure may employ a check valve (not shown) in the purge nozzle behind the tip that prevents all air aspiration through the orifice into the purge nozzle while permitting water flow out the orifice. A primary solenoid valve 136 is disposed in the main water supply line 106. A secondary solenoid valve 138 is disposed along the purge line 116 between the purge nozzle and the remote discharge location. A programmable logic controller PLC 140 sends electrical signals along wire 142 to the solenoids of the primary and secondary valves 136, 138 for opening and closing the primary and secondary valves when desired.

An air accumulator or stand tube 144 is disposed along the main water line 106 upstream of the primary solenoid valve just prior to the purge nozzle. The stand tube works as a physical bubble trap for slow moving, relatively large bubble capture. The stand tube is placed at a highpoint in the water delivery system. Slow moving bubbles entering the purge nozzle simply float up the stand tube due to their buoyancy versus the surrounding water. These bubbles then accumulate over time harmlessly rather than being passed through the purge nozzle. The stand tube has an air purge opening in which a solenoid valve 146 is disposed. The valve 146 can be connected to the PLC via the wire 142. The valve can be controlled manually or by the PLC to direct venting of a mixture of water and the captured air 148 from the system, especially air that accumulates upon initial set-up of the system.

A gas filter 160 can be disposed along the main water supply line 106 between the air charged pressure pot 104 and the purge nozzle 108, upstream of the stand tube 144. The gas filter removes gas from the quenching liquid, preventing air bubbles from collecting in the purge nozzle.

Figure 5:
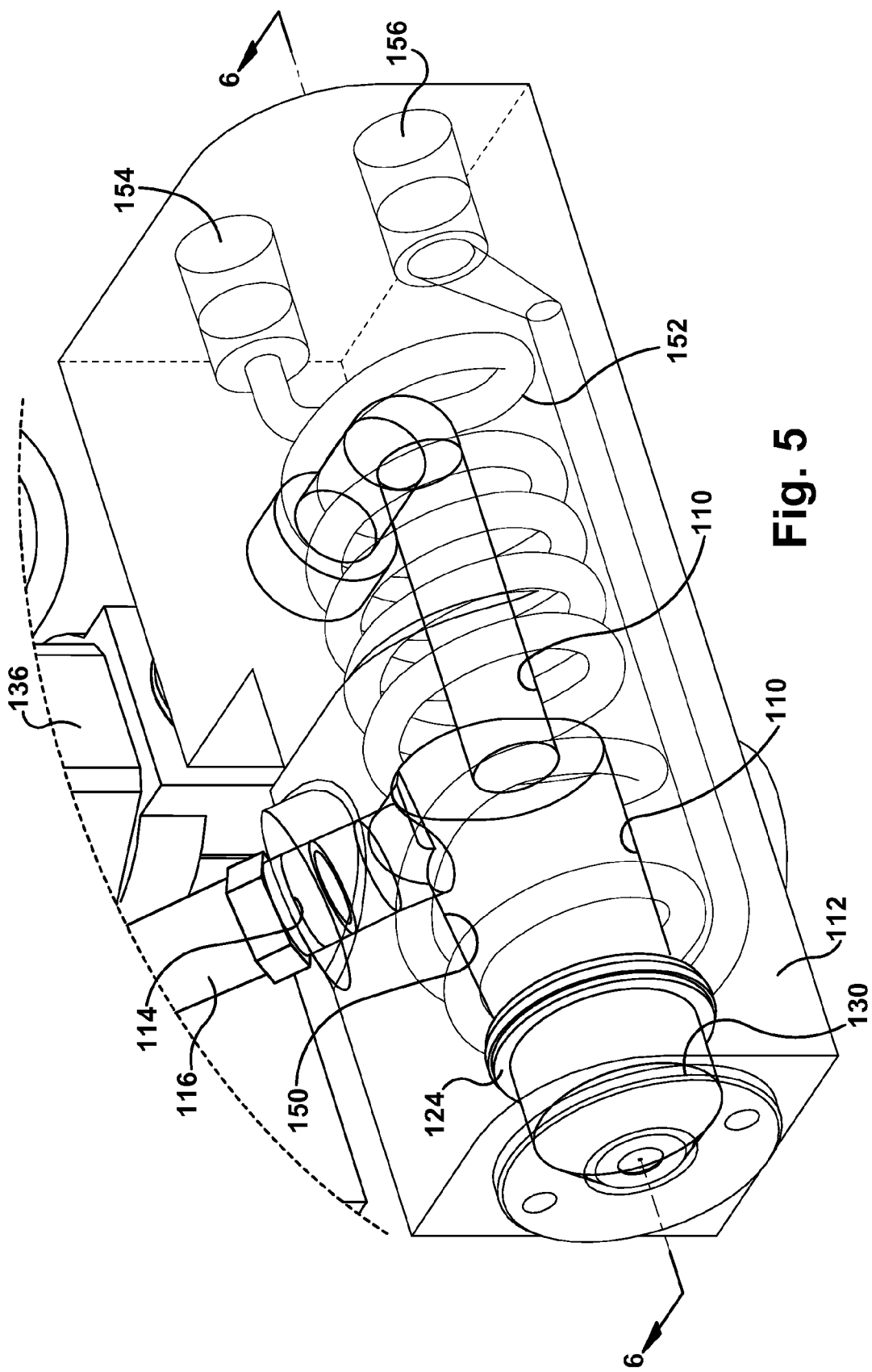
FIG. 5 is a perspective view of a second embodiment of a purge nozzle that can be used in the system shown in FIG. 3.
Figure 6:
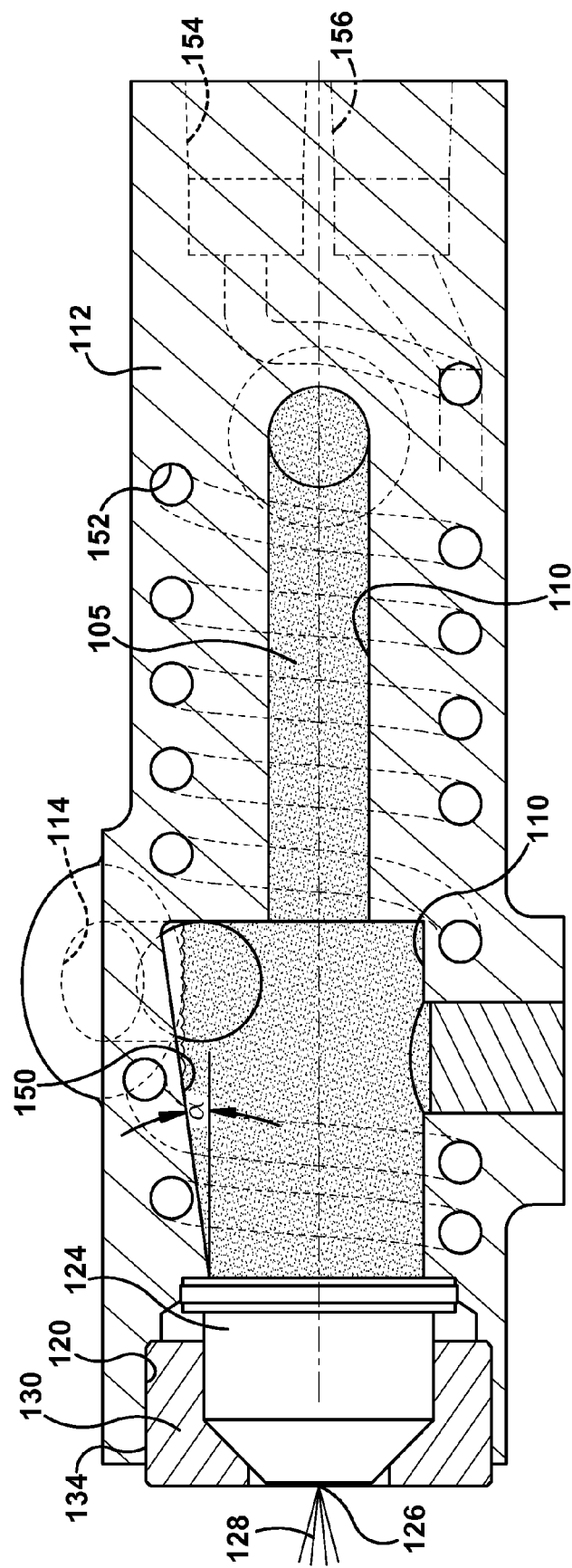
FIG. 6 is a cross-sectional view taken from the plane designated by arrows 6-6 shown in FIG. 5.

Referring to FIGS. 5 and 6, where like parts are given like numbers through the several views, a second embodiment features a nozzle body 112 in which the nozzle passageway 110 includes a sloped surface 150 that extends at an upward angle in a direction from the tip 124 toward the purge opening 114, when the purge opening is located at an upper portion of the purge nozzle. The sloped surface is at a suitable angle, a, for causing the microbubbles to pre-stage near the purge opening, for example, about 8° from horizontal. Microbubbles move along the sloped surface of the nozzle passageway to rest below the purge opening during the quenching operation. The bubbles accumulate to form larger bubbles or air space near and below the purge opening. Then the bubbles are purged by ejecting water and the bubbles through the purge opening, along the purge line to the discharge location. It will be appreciated that various shapes of sloped surfaces and angles of slopes thereof can be used so long as they assist in pre-staging the bubbles for removal near the purge opening.

In a third embodiment, a cooling coil or helix 152 extends in the purge nozzle around the nozzle passageway. The cooling coil has a water inlet 154 and a water outlet 156. The cooling coil extends through a length of the nozzle body around the nozzle passageway. Cooling water is passed into the water inlet, travels through the coil, along the nozzle body and around the nozzle passageway and then is removed from the water outlet, which cools the water passing through the nozzle passageway. The water may remain in the purge nozzle for a sufficient time such that the cooling coil can reduce the water temperature to a point at which the solubility of the air in the water is increased. By cooling water in the purge nozzle, more of the air microbubbles stay in solution. It will be appreciated that other coolants can be used in the cooling coil besides water, especially those adapted for use at high temperatures.

The pressure transducer 157 can be used with one or more of the purge nozzle, the purge nozzle with pre-staged bubbles, the cooling coil and the air filter discussed below. The pressure transducer 157 (FIG. 3) produces a trace on a data acquisition system 159 showing pressure as a function of time in the main water line 106. By examining the trace, a magnitude (amplitude) of a pressure ringing that occurs when the primary on/off solenoid is closed is indicative of how much air is trapped in the nozzle body near the orifice tip. The ringing amplitude changes with direct correlation of the amount of air captured in the nozzle body orifice tip. If the air present increases in the nozzle body, the pressure ringing gets larger. Likewise, after a purge when the air is minimized in the nozzle body, the pressure ringing is reduced. Once the system is purged using the purge nozzle, pressure ringing amplitude is minimized and shut off performance is enhanced. When the control signal is given to turn the purge nozzle off, the water stops flowing instantly from the purge nozzle versus slowly decaying over time. The purging of air from the purge nozzle enables the shut off time in a system in which air moves into the purge nozzle to approach the shut off time of a system at room temperature with only water in the purge nozzle. Removing the air from the purge nozzle during purging actually improves the shut off time of the water from the orifice tip. A plotted pressure reading from the pressure transducer enables fine tuning as to the frequency and duration of opening of the purge valve solenoid during the normal purging operation.

In a method for quenching a scored sheet of hot glass a jet of the quenching liquid is sprayed on the glass sheet by closing the secondary valve 138 and by opening the primary valve 136. The pressurized liquid is fed along the main liquid supply line, along the nozzle passageway and through the tip orifice. After the laser scoring and quenching process, the purge nozzle is moved away from the glass sheet. Gas in the purge nozzle is purged by opening the secondary valve and directing the liquid through the purge opening 114 and along the purge line to the discharge location. Purging normally occurs at the second side of the glass 62 but could occur at the first side 64 of the glass. Purging can occur each cycle or multiple scoring runs could occur before normal purging, as in the case where the cooling coil is used. One cycle, as discussed above means, for example, from the beginning of one scoring run to the beginning of the next scoring run.

The PLC is programmed as to the timing and duration of the opening and closing of the primary, secondary and optionally the stand tube solenoid valves. The solenoid valves are fast on/off type solenoid valves as known in the art. Purging can be carried out when the primary valve is open or closed. First, purging can be carried out by sending signals from the PLC to the secondary solenoid to open the secondary valve after sending signals to the primary solenoid to open the primary valve. The secondary valve is open for a duration sufficient for removing gross air bubbles from the purge nozzle while quenching fluid passes through the orifice. Although water leaves the orifice, the purge nozzle is not near the glass in this operation (e.g., it is located at the first side). This purging operation may be conducted manually or at intervals programmed in the PLC.

In the second more normal operation, at the end of the quenching operation purging is carried out by opening the secondary solenoid valve after sending signals from the PLC to the primary solenoid to close the primary valve. The secondary solenoid valve is slaved to the shutoff of the primary solenoid valve. An amount of quenching liquid removed by the purge is less than an amount that would cause air to enter the purge nozzle through the orifice. The secondary solenoid valve would be closed after a pre-set interval as instructed by the PLC.

Figure 7:
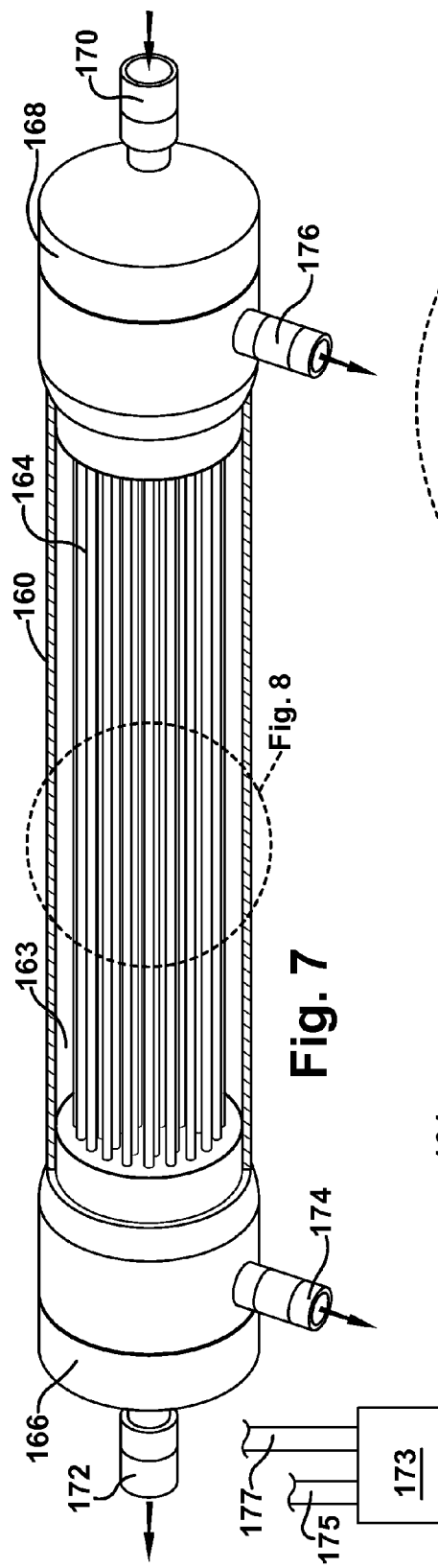
FIG. 7 is a cross-sectional view of an air filter system shown in FIG. 3.
Figure 8:
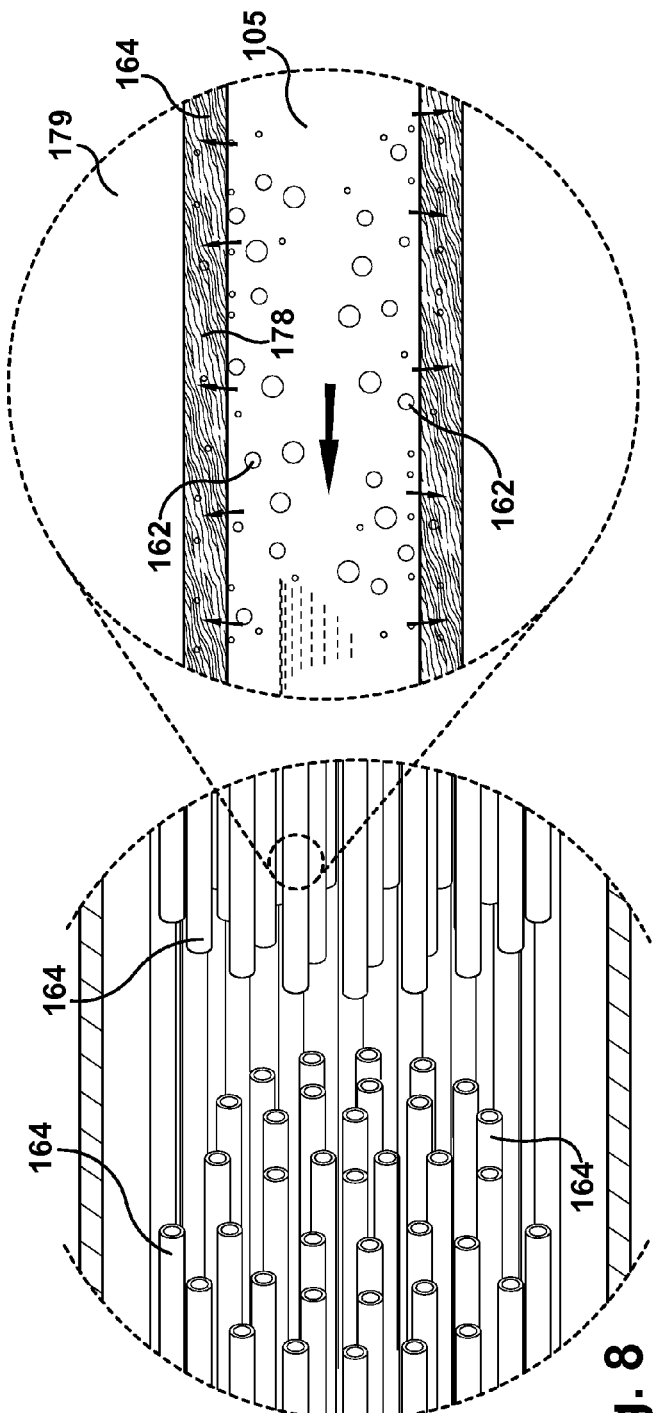
FIG. 8 is an enlarged cross-sectional view taken from dotted lines in FIG. 7.

The gas filter 160 can be used for removing air (or other gas) bubbles 162 from water or other quenching liquid 105. For simplicity, further discussion will focus on removing air from water. For example, one suitable device is a MEMBRANA™ micromodule filter for removing a gas from liquid. Referring to FIGS. 7 and 8, the gas filter has an elongated body 163 in the form of a cartridge. A plurality of small tubes or hollow fibers 164 made of hydrophobic material extend along a length of the body between end caps 166, 168. In one end cap 168 there is a water inlet 170 and in the other end cap 166 there is a water outlet 172 that are exposed to open ends of the fibers. The fibers are sealed in the end caps so that water is forced along the hollow interior of the fibers. Two gas outlet ports 174, 176 are present for removing air bubbles under a vacuum from the filter. A vacuum source 173 is connected to gas outlet ports 174, 176 by tubing 175, 177.

The air-rich water enters the water inlet 170 and travels along the hollow fibers 164. While the water is in the fibers, the vacuum applied along the gas outlet ports 174, 176 draws air bubbles 162 from the water 105 through pores 178 in the walls of the fibers in the direction of the arrows to a space 179 exterior of the fibers and then out the gas outlet ports 174, 176. Because the fibers are hydrophobic, water is not permitted to pass through them. By the time the water reaches the water outlet, it has a substantial amount of air removed from it. The water with depleted air then exits the filter through water outlet 172 and travels along the main water line to the purge nozzle. Operating the purge nozzle at high temperatures with the reduced air content due to the filter device now avoids bubble formation that would normally occur when the water includes insoluble air. The gas filter can be used alone with an ordinary nozzle, without cooling coils and without the staging of bubbles design, or it can be used in combination with one, more or all of the disclosed gas removal features.

The shut off performance enhancement is due to the compressibility of air versus water. If air is present in the nozzle body when the primary on/off solenoid is turned on, the air cannot escape through the nozzle orifice due to its size and location in the body. Consequently, it has no choice but to be compressed by the water pressure that is forcing the water through the tip orifice. Once the primary solenoid is turned off, however, ambient air pressure is returned to the nozzle body cavity via the tip orifice. When this occurs the bubble relaxes and returns to its normal size at ambient pressure. This process in turn forces water out the tip orifice, effectively causing a time delay in the shut off performance of the purge nozzle. Since water is not compressible but air is, this slow shut off performance occurs only if air is present. If no air bubbles or a reduced amount of air bubbles are present in the nozzle body, such as when using one or more of the purge nozzle, the purge nozzle with pre-staging of bubbles feature, the purge nozzle with cooling coil, or the gas filter, nozzle shut-off performance will remain consistent across a wide range of temperatures. This level of process control contributes to the success of laser scoring.

Example

This example describes operation of the purge nozzle. The following is a pre-purging sequence. The pre-purging sequence is conducted only to remove gross air bubbles from the system such as when a nozzle tip is replaced or during system start up. First, the primary solenoid valve is turned off and the purge or secondary solenoid is turned off. The water pressure is on. The water supply pressure within the laser scoring environment ranges from about 3 to 70 psi. The pressure is provided by an air charged pressure pot. The pressure transducer reports pressure as a function of time in the water line. The air accumulator purge valve is closed. Next, the primary solenoid is turned on. The air accumulator valve is open for 5 seconds and then closed. The secondary solenoid is on for about 10 seconds at 10 hertz oscillation. This creates turbulent flow in the purge nozzle to disrupt bubbles located there. The secondary solenoid is then turned off. The primary solenoid is turned off. The system is now ready for normal running sequence.

In preparing for the normal running sequence, the primary solenoid is off. The secondary solenoid is off. The water pressure is turned on. The water supply pressure within the laser scoring environment ranges from about 3 to 70 psi. The pressure transducer is reporting. The stand tube is closed. The purge nozzle is now ready for use.

During normal operation, the optical head is at the first side of the glass; the primary solenoid is turned on. Water flows through the orifice out the nozzle tip and remains on for the desired duration of quenching during laser scoring. The TAM application has, for example, a 23 second cycle time (i.e., from the starting home position at the first side of the glass, through quenching during laser scoring, to the end position at the second side of the glass and returning to home). When quenching during laser scoring, the flow rate of the water jet from the tip orifice is 10 to 20 ml/min. Quenching occurs at a rate of up to about 1000 mm/sec and for a glass width of about 1500 mm. After quenching the primary solenoid is turned off. Water flow out the purge nozzle ceases immediately. Immediately thereafter, the secondary solenoid is turned on, being slave triggered to the primary solenoid. The TAM begins to move toward its home position at an upward location at the first side of the glass. The secondary solenoid remains on for a desired duration (e.g., 50 milliseconds). This can remove about 1 ml of a mixture of water and air bubbles, for example. Waste water and air are purged to the discharge location during purging. The secondary solenoid is then turned off. The system is now ready for another cycle of quenching during laser scoring.

What is claimed is:

1. A method for preventing gas from occupying a spray nozzle used in quenching a sheet of hot glass during a scoring process, comprising:
   providing a source of pressurized quenching liquid, a main liquid supply line leading from said pressurized quenching liquid source, a spray nozzle including a body having a nozzle passageway in communication with said main liquid supply line, and a tip connected to said nozzle body in communication with said nozzle passageway, said tip having an orifice adapted to release a jet of said quenching liquid, and a gas removal device adapted to remove gas from said quenching liquid;
   removing gas from said quenching liquid using said gas removal device to prevent said gas from occupying said spray nozzle;
   spraying a jet of said quenching liquid through said tip orifice onto said sheet during a scoring process without interruption in said jet; and
   shutting off said jet of said quenching liquid without a substantial time delay once said scoring process is complete,
   wherein said gas removal device comprises a purge opening at an upper location of said spray nozzle in fluid communication with said nozzle passageway; a purge line leading from said purge opening to a discharge location remote from said nozzle purging gas in said nozzle, a primary valve disposed in said main liquid supply line and a secondary valve disposed between said spray nozzle and said discharge location; said method further comprising removing said gas by opening said secondary valve and directing said liquid through said purge opening and along said purge line to said discharge location.

2. The method of claim 1, further comprising providing a primary solenoid, a secondary solenoid, and a programmable logic controller (PLC), and sending electrical signals from said PLC to said primary solenoid for opening and closing said primary valve and to said secondary solenoid for opening and closing said secondary valve.

3. The method of claim 2, further comprising purging by sending said electrical signals from said PLC to said primary solenoid to open said primary valve, and sending said electrical signals from said PLC to said secondary solenoid to open said secondary valve, said secondary valve being open for a duration sufficient for removing gross air bubbles from said nozzle while quenching fluid passes through said tip orifice.

4. The method of claim 2, further comprising purging by sending said electrical signals from said PLC to said primary solenoid to close said primary valve, automatically opening said secondary valve upon said closing of said primary valve, and closing said secondary valve after a predetermined time interval, wherein an amount of quenching liquid removed by said purging is less than an amount that would cause air to enter said nozzle through said orifice.

5. The method of claim 1, wherein said nozzle passageway comprises a sloped surface that extends at an upward angle in a direction from said tip toward said purge opening, said method further comprising moving bubbles of said gas along said sloped surface of said nozzle passageway from near said tip toward said purge opening and then purging said liquid and said bubbles through said purge opening, along said purge line to said discharge location.

6. A method for preventing gas from occupying a spray nozzle used in quenching a sheet of hot glass during a scoring process, comprising:

providing a source of pressurized quenching liquid, a main liquid supply line leading from said pressurized quenching liquid source, a spray nozzle including a body having a nozzle passageway in communication with said main liquid supply line, and a tip connected to said nozzle body in communication with said nozzle passageway, said tip having an orifice adapted to release a jet of said quenching liquid, and a gas removal device adapted to remove gas from said quenching liquid;

removing gas from said quenching liquid using said gas removal device to prevent said gas from occupying said spray nozzle;

spraying a jet of said quenching liquid through said tip orifice onto said sheet during a scoring process without interruption in said jet;

shutting off said jet of said quenching liquid without a substantial time delay once said scoring process is complete; and a cooling coil that extends in said nozzle body around said nozzle passageway, said cooling coil having a fluid inlet and a fluid outlet, said method further comprising passing coolant into said fluid inlet, through the coil, through said nozzle body and around said nozzle passageway and removing said coolant from said fluid outlet to remove said gas from said quenching liquid by cooling said quenching liquid passing through said nozzle passageway and increasing a solubility of said gas in said quenching liquid.

7. A method for preventing gas from occupying a spray nozzle used in quenching a sheet of hot glass during a scoring process, comprising:

providing a source of pressurized quenching liquid, a main liquid supply line leading from said pressurized quenching liquid source, a spray nozzle including a body having a nozzle passageway in communication with said main liquid supply line, and a tip connected to said nozzle body in communication with said nozzle passageway, said tip having an orifice adapted to release a jet of said quenching liquid, and a gas removal device adapted to remove gas from said quenching liquid;

removing gas from said quenching liquid using said gas removal device to prevent said gas from occupying said spray nozzle;

spraying a jet of said quenching liquid through said tip orifice onto said sheet during a scoring process without interruption in said jet;

shutting off said jet of said quenching liquid without a substantial time delay once said scoring process is complete; and a stand tube that is elevated relative to said main line between said pressurized quenching liquid source and said spray nozzle, said method further comprising flowing bubbles of said gas from said main liquid line into said stand tube and then removing said gas from said stand tube.

8. A method for preventing gas from occupying a spray nozzle used in quenching a sheet of hot glass during a scoring process, comprising:

providing a source of pressurized quenching liquid, a main liquid supply line leading from said pressurized quenching liquid source, a spray nozzle including a body having a nozzle passageway in communication with said main liquid supply line, and a tip connected to said nozzle body in communication with said nozzle passageway, said tip having an orifice adapted to release a jet of said quenching liquid, and a gas removal device adapted to remove gas from said quenching liquid;

removing gas from said quenching liquid using said gas removal device to prevent said gas from occupying said spray nozzle;

spraying a jet of said quenching liquid through said tip orifice onto said sheet during a scoring process without interruption in said jet;

shutting off said jet of said quenching liquid without a substantial time delay once said scoring process is complete;

providing an air filter including an elongated body having opposing ends, hollow porous hydrophobic fibers extending along a length of said body between said ends and being sealed at said ends to expose openings in said fibers at said ends, a fluid inlet at one of said ends and a fluid outlet at another of said ends in fluid communication with said fiber openings, said fluid inlet being in fluid communication with said main supply line from said pressure source and said fluid outlet being in fluid communication with said main supply line leading to said nozzle, vacuum ports along the length of said body in communication with an exterior of said fibers, and a vacuum source connected to said vacuum ports;

passing gas-rich said quenching liquid, from said pressurized source of said quenching liquid into said fluid inlet, and along an interior of said fluid fibers;

applying a vacuum from said vacuum source pulling gas from said quenching fluid through the pores of said fibers, and removing said gas through said vacuum ports; and passing gas-depleted said quenching liquid through said fluid outlet, into said main quenching liquid supply line and to said spray nozzle.

* * * * *